United States Patent
Arkko et al.

(10) Patent No.: US 7,813,718 B2
(45) Date of Patent: *Oct. 12, 2010

(54) AUTHENTICATION IN A COMMUNICATION NETWORK

(75) Inventors: Jari Arkko, Kauniainen (FI); Pekka Nikander, Jorvas (FI); Mats Näslund, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 12/370,781

(22) Filed: Feb. 13, 2009

(65) Prior Publication Data

US 2009/0253411 A1    Oct. 8, 2009

Related U.S. Application Data

(63) Continuation-in-part of application No. 10/584,293, filed as application No. PCT/EP03/51101 on Dec. 24, 2003, now Pat. No. 7,551,914.

(51) Int. Cl.
*H04M 1/66* (2006.01)

(52) U.S. Cl. ..................... 455/411; 370/338
(58) Field of Classification Search ............. 455/411; 709/229, 230; 713/169; 370/338
See application file for complete search history.

(56) References Cited

U.S. PATENT DOCUMENTS

| 2002/0002678 A1* | 1/2002 | Chow et al. ............ 713/169 |
| 2003/0031151 A1* | 2/2003 | Sharma et al. ........... 370/338 |
| 2004/0184605 A1  | 9/2004 | Soliman |
| 2005/0257255 A1* | 11/2005 | Quick et al. ............ 726/9 |

FOREIGN PATENT DOCUMENTS

GB    2 367 986 A    4/2002

OTHER PUBLICATIONS

International Search Report of PCT/EP2003/051101, mailed Sep. 3, 2004.
Lein Harn, "On the Security of Wireless Network Access with Enhancements", Proceedings of the 2003 ACM Workshop on Wireless SEC, 'Online!, Sep. 2003, pp. 88-95, XP002292895.
Lamport, "Password Authentication with Insecure Communication", Communications of the Association for Computing Machinery, vol. 24, No. 11, Nov. 1, 1981, pp. 770-772, XP000577349.

* cited by examiner

*Primary Examiner*—Lester Kincaid
*Assistant Examiner*—Phuoc Doan
(74) *Attorney, Agent, or Firm*—Nixon & Vanderhye, P.C.

(57) ABSTRACT

A mobile wireless terminal, the terminal comprising a generator configured to generate and store a first numerical chain comprising a series of n values using a one-way coding function such that a given value within the chain is easily obtainable from a subsequent value, but the subsequent value is not easily obtainable from that given value, and an authentication requester configured to disclose a value from the numerical chain to an access node, in order to allow the access node to authenticate the mobile wireless terminal, wherein the disclosed value succeeds any values in the chain already disclosed by the mobile wireless terminal.

9 Claims, 5 Drawing Sheets

AUTHENTICATION IN A COMMUNICATION NETWORK

This application is a continuation-in-part of U.S. patent application Ser. No. 10/584,293 filed Jun. 23, 2006, entitled Authentication in a Communication Network, which is the U.S. national phase of international application PCT/EP2003/051101, filed Dec. 24, 2003, which designated the U.S., the entire contents of which are hereby incorporated by reference.

FIELD OF THE TECHNOLOGY

The present invention relates to authentication in a communication network and more particularly, though not necessarily, to the authentication of wireless terminals roaming in a visited communication network.

BACKGROUND

FIG. 1 illustrates diagrammatically the architecture of a cellular communications network for mobile wireless terminals. The network comprises a set of access nodes 4, 6 interconnected by an IP network 12. A subscriber owns user equipment (UE) 1 and has a subscription with a "home" network 3. The home network has a Home Location Register (HLR) 10 which comprises a database that stores subscriber information such as billing information, service allowance and subscriber location. The subscriber may take the UE and roam to a visited foreign wireless network 2, where he wishes to access certain communication services via a first access node 4, for example voice calls (routed through a circuit switched network), Internet access, peer-to-peer data connections with other UEs, or other data services. Before the subscriber is allowed to access such services via the UE, the visited network requires that the subscriber be authenticated, and this is typically achieved by the visited network 2 contacting the home network 3. The visited network may perform some initial check to verify that the UE is making a valid request.

The visited network 2 will not grant the subscriber access to any services until it knows that such access will be paid for, and the visited network therefore sends an authentication request 5 to the home network to determine whether the subscriber is a registered subscriber of the home network, and is therefore trusted. Only after the home network 3 has confirmed, in message 5', that the subscriber is registered with the home network will the visited network provide access to the available services. The authentication process may require more than one pair of messages 5, 5' to be exchanged between the visited network and the home network. The full authentication procedure may be a lengthy process, both in terms of the time it takes and the communication overheads enforced on the communication network. Protocols for use in authenticating roaming subscribers include MAP, RADIUS and DIAMETER.

After successful authentication, circumstances may change such that the UE has to access the visited network via an alternative access node 6. The access node that the UE uses to connect to the visited network can depend on a variety of factors, including amongst others physical proximity, bandwidth capacity and existing operational load. This may be the case, for example, in a wireless LAN, where cell sizes are small and movement of the UE between access nodes may be frequent.

Each time the UE wishes to attach to a new access node, the access node must repeat the authentication process carried out by the previous access nodes by sending a request 7 to the home network 3, and awaiting a response 7' from the home network. This second authentication process takes a similar length of time and consumes a similar amount of network resources to the initial authentication process. It is undesirable for excessive amounts of signalling data to be transferred over the network; the network operators are provided with fixed bandwidth allocations, and can only charge subscribers for service-related data. Signalling data represents unchargeable bandwidth usage, and network operators wish to minimise its use. The second authentication process will likely result in an interruption of the services provided to the subscriber. This may not be a significant problem if, for example, the subscriber is accessing a website, where a small delay in the data being supplied does not adversely affect the quality of the service provided. However, for services such as voice calls or streaming multimedia broadcasts, an interruption to the service is undesirable.

It is therefore desirable to provide a secure authentication mechanism in which the authentication time when switching access nodes is reduced. It is also desirable to provide a secure authentication mechanism that bypasses the need to query the home network to confirm the identity of the UE, reducing the signalling overheads on the home network.

A concept known as "fast handoff" has been developed for use in networks in which UEs switch between different access nodes on a frequent basis, the concept providing a faster means for switching between alternative access nodes. A full authentication is provided, but bypassing the home network. This may be achieved using either a pre-emptive control from the home network, e.g. authenticating a UE to use a new access node prior to switching over from the current access node, or via some context transfer between the two access nodes, avoiding the home network altogether.

The first of these fast handoff mechanisms still suffers from undesirable large signalling overheads, requiring further signalling between the home and visited networks each time the UE switches access nodes. Considering further the second of these "fast handoff" mechanisms, a number of different fast handoff implementations have been proposed and these avoid excess communication with the home network 3 by using some type of session key or re-authentication key distributed to the access nodes. The keys are agreed upon by both the home network and the visited network during initial authentication, and the keys are distributed among the access nodes of the visited network. This enables fast re-attachment of a UE when switching between access nodes but exposes the system to unnecessary security vulnerabilities, the main one being that a single compromised access node has access to all such session and re-authentication keys. A single compromised access node can therefore provide information to a malicious third party which would enable that party to imitate the UE and access services from the visited network without having to provide payment.

It is therefore desirable to provide a fast handoff mechanism for fast switching of mobile nodes between access nodes in an access network and which avoids the risk that a single access node can be compromised to allow a third party to access other access nodes.

SUMMARY

In accordance with a first aspect of the technology disclosed herein there is provided a method of authenticating a mobile node to a communication system, the communication system comprising a plurality of access nodes, the method comprising (a) generating a numerical chain comprising a series of values using a one-way coding function such that a given value within the chain is easily obtainable from a subsequent value, but the subsequent value is not easily obtainable from that given value; (b) sending a value from the first numerical chain from the mobile node to an access node to which the mobile node wishes to attach; and (c) using the sent value at the access node to authenticate the mobile node.

In accordance with a second aspect of the technology disclosed herein there is provided a method of deriving a secure authentication key when a mobile node authenticates itself to an access node in accordance with any preceding claim, the method comprising providing a first authentication key $K_{S0}$ for use by the mobile node and a first access node; sending a hash of the first authentication key hash($K_{S0}$) to a second access node and the mobile node; and generating a new authentication key $K_{S1}$ in accordance with the hash hash ($K_{S0}$).

In accordance with a further aspect of the technology disclosed herein there is provided a mobile wireless terminal, the terminal comprising means for generating and storing a first numerical chain comprising a series of n values using a one-way coding function such that a given value within the chain is easily obtainable from a subsequent value, but the subsequent value is not easily obtainable from that given value; and means for disclosing values from the numerical chain to an access node in order to allow the access node to authenticate the mobile wireless terminal.

In accordance with a further aspect of the technology disclosed herein there is provided an access node of a communication system having means for receiving from a mobile node a value of a first numerical chain comprising a series of n values using a one-way coding function such that a given value within the chain is easily obtainable from a subsequent value, but the subsequent value is not easily obtainable from that given value; and means for authenticating the mobile node on the basis of that value.

In accordance with a further aspect of the technology disclosed herein there is provided a control node of a communication system having means for receiving from a mobile node or an access node a value of a first numerical chain comprising a series of n values using a one-way coding function such that a given value within the chain is easily obtainable from a subsequent value, but the subsequent value is not easily obtainable from that given value; and means for authenticating the mobile node on the basis of that value.

DETAILED DESCRIPTION

Figure 1:
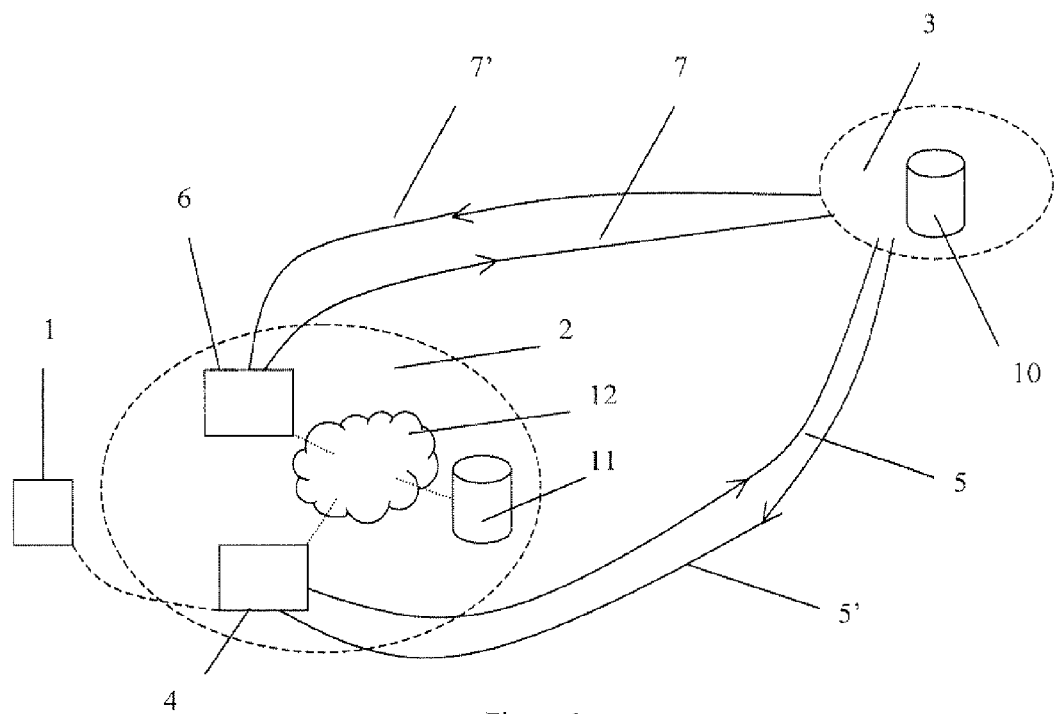
FIG. 1 illustrates diagrammatically the architecture of a communications network.
Figure 2:
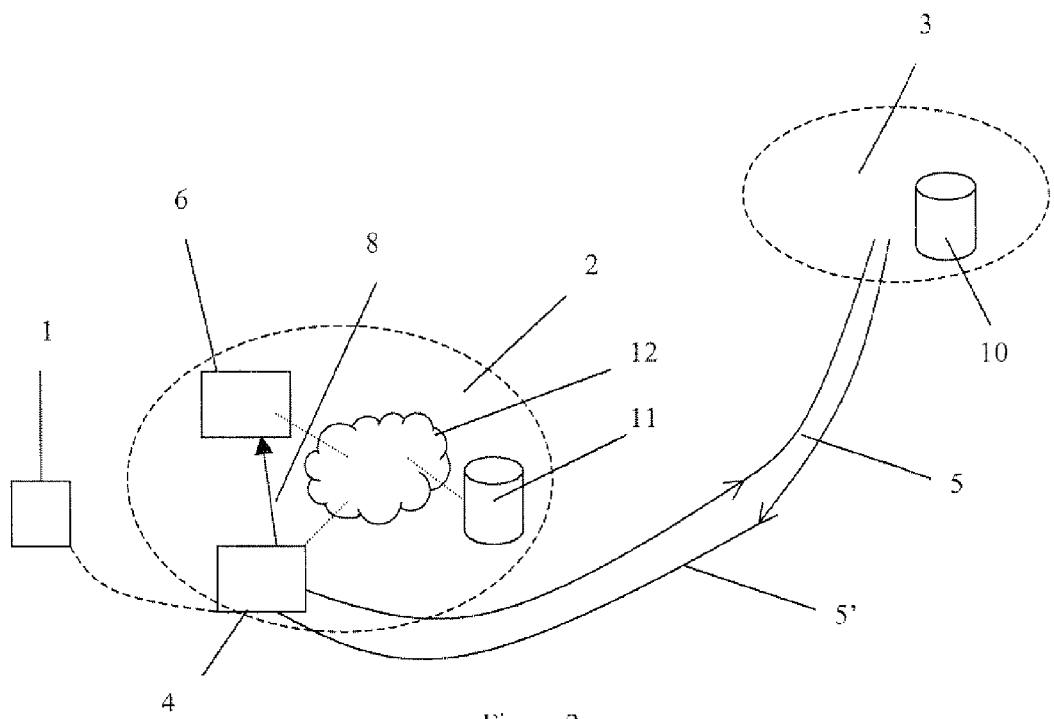
FIG. 2 illustrates diagrammatically the architecture of a communications network in accordance with an example embodiment.

FIG. 2 illustrates diagrammatically the architecture of a cellular communications network for mobile wireless terminals in accordance with a first example embodiment, with like numerals representing like elements to those shown in FIG. 1. Access nodes 4, 6 are interconnected by a network. The network may be a cellular telecommunications network, e.g. a 3G network, WLAN, a combination of 3G and WLAN networks, or any other type of cellular network. A subscriber to a home network 3 owns a mobile wireless terminal 1 and seeks to access services such as voice calls, Internet access, or other data services from a visited (foreign) wireless network 2. Prior to granting the subscriber access to the services, the visited network requires authorisation from the subscriber's home network. In order for the subscriber to be authenticated, the visited network sends an authentication request to the home network, which checks the subscriber details in the HLR 10. This authentication process is defined in the MAP, RADIUS and DIAMETER (RFC 3588) protocols and, for wireless networks in particular, in the 802.1x, 802.11i and EAP (RFC 2298) protocols. Upon successful authentication, the visited network stores the subscriber's details in its Visitor Location Register (VLR) 11. The UE may then access the service available from the visited network via a first access node 4.

An authentication key, or session key, may be derived using some existing exchange protocol, and is used to encrypt traffic between the UE and a given access node after initial authentication.

During the initial authentication process (e.g. exchange of messages 5, 5'), a numerical chain is determined that will be used to re-authenticate the mobile node if it switches access nodes at a later stage. In certain of the embodiments the numerical chain may be known only to the UE. In other embodiments (which may be more suitable for application to existing protocols such as RADIUS and DIAMETER) the numerical chain is known to both the UE and the home network. The chain is a sequence of n numbers having values $H_1, H_2 \ldots H_n$, such that a given value within the chain is easily obtainable from a subsequent value, but the subsequent value is not easily obtainable from the given value. This may be achieved using a one-way coding function, for example a hash function, to achieve a chain in which $H_{i-1=hash}(H_i)$. The function hash( ) is defined in such a way that it is very difficult to reverse the operation, i.e. obtain the value that the function has operated upon. The one-way hash function used may be, for example, MD5 or SHA-1. The function hash( ) can be public knowledge; its one-way functionality means that it does not need to be secret. Any cryptographically secure one-way function is appropriate.

Figure 4:
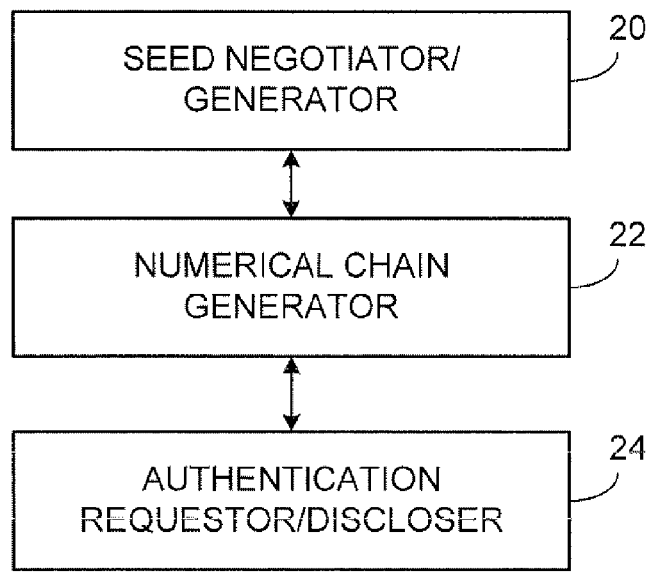
FIG. 4 illustrates diagrammatically the architecture of a portion of a mobile wireless terminal in accordance with an example embodiment.

The numerical chain is generated from a seed value that is the last value in the chain, $H_n$. Successive applications of the one-way hash( ) function return the preceding values in the chain, back down to the first number in the sequence $H_1$. The seed value is agreed between the UE and the home network, being sent between the two parties in some encrypted form. The seed value may be generated by a pseudo-random number generator. The seed value may alternatively be based on some value known only to or only derivable by the UE and the home network, e.g. the EAP MSK or EMSK values, in which case existing authentication protocols would not need to be adapted to implement the protocol of this embodiment. According to an alternative embodiment, the UE generates the seed value by itself, the home network having no knowledge of it, and being unable to obtain it. In view of the foregoing, FIG. 4 shows that an example embodiment of mobile wireless terminal 1 (UE) comprises seed negotiator/generator 20. The mobile wireless terminal 1 (UE) also comprises numerical chain generator 22 and authentication requestor/discloser 24, which perform functions described herein.

Having generated the seed value (using seed negotiator/generator 20), both the UE and the home network are capable of generating the remainder of the sequence by successive applications of the one-way coding function to obtain $H_1$. Accordingly, FIG. 4 further shoes that the UE as comprising the numerical chain generator 22. Following initial authentication of the subscriber to the visited network, the value $H_1$ is distributed to the access nodes within the access network by a first one of the access nodes to which the UE is attached, along with the authentication encryption key $K_R$. Alternatively, the access nodes receive the value of $H_1$ from a control node. The control node is provided with $H_1$ by either the UE or the home network, and the control node subsequently updates the access nodes.

Considering the scenario in which the UE moves to a new access node to request authentication, the UE presents (e.g., discloses, using authentication requestor/discloser 24) to a second access node 6 the authentication key $K_R$, and confirms its identity by presenting the value $H_2$ from the numerical chain. Accordingly, FIG. 4 also shows that the UE comprises authentication requestor/discloser 24 which discloses to the new access node a value ($H_2$) from the numerical chain which facilitates authentication of the UE by the new access node.

Figure 5:
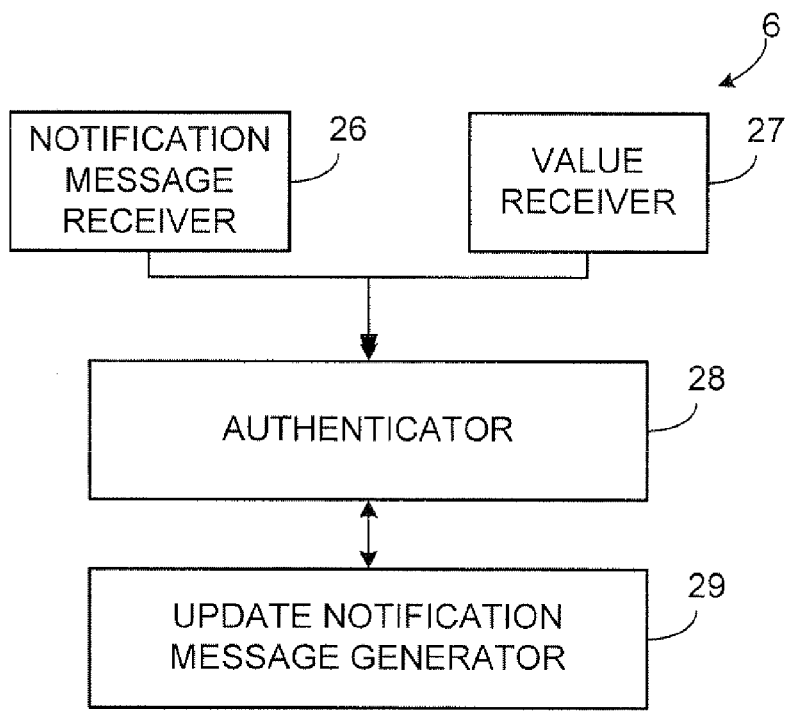
FIG. 5 illustrates diagrammatically the architecture of a portion of an access node in accordance with still another example embodiment.

An example access node such as second access node 6 is shown in FIG. 5 as comprising notification message receiver 26; value receiver 27; authenticator 28; and update notification message generator 29. The authenticator 28 of the second access node 6 knows the one-way coding function, and applies the function to the value $H_2$, thereby obtaining the value $H_1$, since hash($H_2$)=$H_1$. The second access node compares the value of $H_1$ distributed to the access nodes previously with the value of $H_1$ obtained by "hashing" the value $H_2$ supplied by the UE. Since the only two devices with knowledge of any subsequent values in the numerical chain are the UE and the home network, if the two values of $H_1$ are equal, the UE is deemed to have been authenticated. If the two compared values do not match, the request to access services may be denied. Upon successful authentication, the second access node 6 sends an update notification message 8 to the other access nodes of the access network, so that they are aware that the UE has switched access nodes. The update notification message may comprise the most recent H value provided by the UE, or alternatively it may simply comprise an indication that the UE has switched access nodes, in which case the other access nodes in the access network increment a counter by one.

When the UE wishes to switch to a further access node and requires another re-authentication, the UE (e.g., authentication requestor/discloser 24 of the UE) supplies that further access node with the next H value in the numerical chain. The further access node then operates on the disclosed H value with the hash( ) function and compares it to the most recently distributed H value or, in the case where only a counter has been incremented, it applies the hash( ) function an appropriate successive number of times and compares the result to the stored H value. It is required that each time it requests re-authentication the UE use a higher H value in the sequence than those already used to ensure that a compromised access node cannot use its knowledge of $K_R$ at an access node where the UE has not visited.

The update notification may be sent through a local multicast mechanism to all of the access nodes of the access network. This process, and the initial distribution of $H_1$ and $K_R$, must be secure. In a further embodiment, the distribution of information relating to multiple users is sent in batches, e.g. all user information is updated every 10 seconds.

Figure 6:
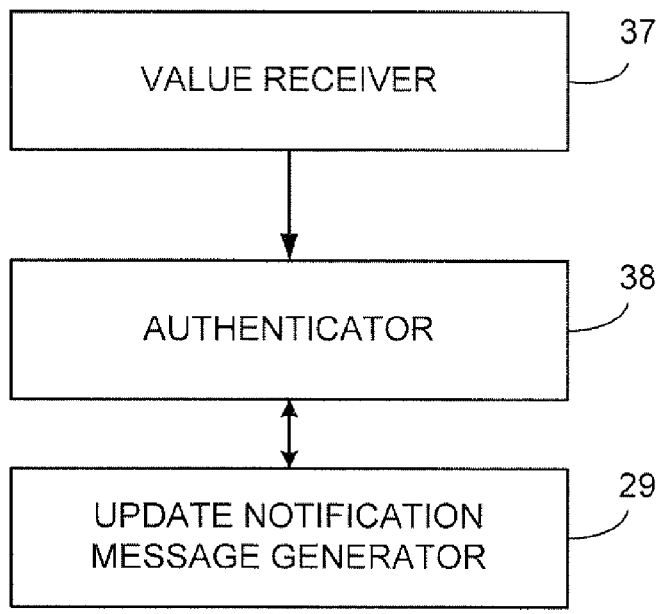
FIG. 6 illustrates diagrammatically the architecture of a portion of a control node in accordance with an example embodiment.

In an alternative embodiment, the UE is authenticated to a new AN, via a control node. An example control node is shown in FIG. 6 as comprising value receiver 337 and authenticator 38. Instead of broadcasting an update notification to the access nodes, in this alternative embodiment the control node stores the new H value. When the UE requests authentication at a further access node, the further access node queries the control node with the new H value provided by the UE. The control node applies the one-way function of authenticator 38 to the new H value for comparison with the stored H value. If the two values match, the control node authenticates the UE to the further access node. In this embodiment, the access nodes do not need to be able to store or apply the one-way coding function to supplied H values. It is also potentially more secure to have a trusted single location performing the authentication, rather than distributing values throughout the communication system.

The numerical chain of n values is generated by n−1 successive iterations of the hash function on the initial seed value. By allowing for a maximum of n−1 applications of the one-way coding function the system allows only for a finite number of handovers between access nodes. After the maximum number of allowed handovers between access nodes has been reached, it is necessary to restart the process by generating a new numerical chain at the UE and the home network. Thus, in the event that the system is compromised by a third party, the system will only permit this third party to switch access nodes a finite number of times before the system's security is restored. Therefore, in order to set a higher level of security by demanding more frequent checks with the home network, the value of n is set lower.

Figure 3:
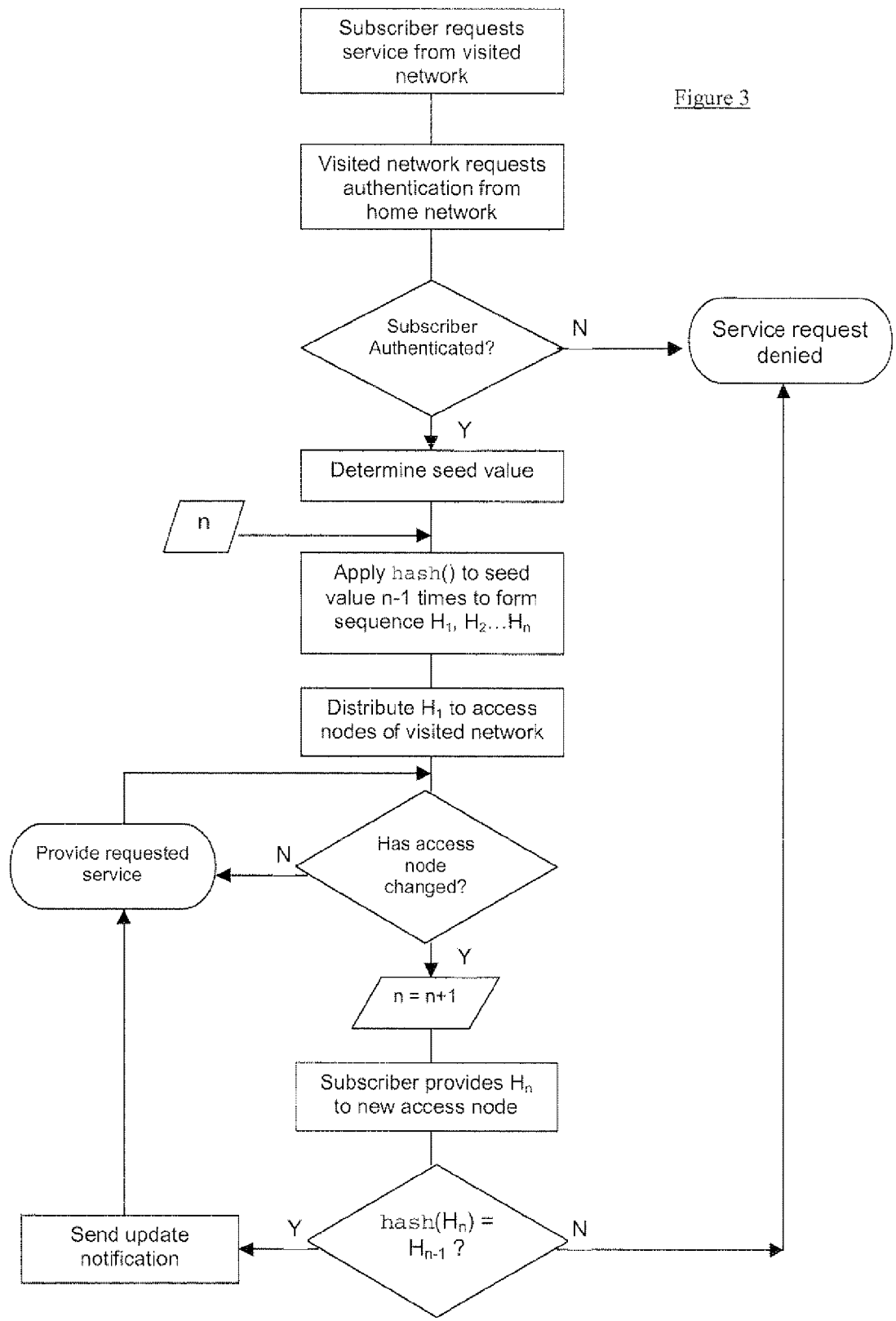
FIG. 3 is a flow diagram illustrating the method of certain example embodiments.

The steps of the methods of the embodiment described above in which the value of n increments by one at each successive authorisation attempt are illustrated in the flow diagram of FIG. 3.

Figure 4A:
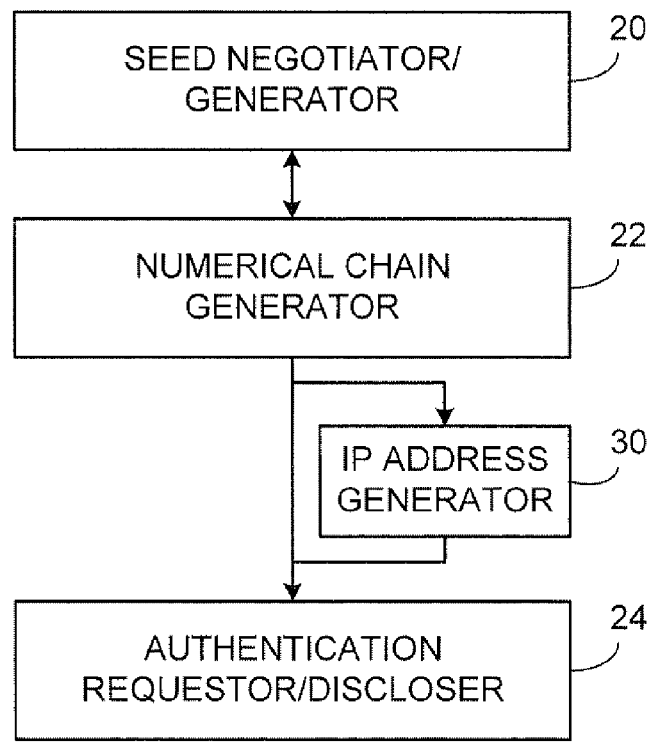
FIG. 4A illustrates diagrammatically the architecture of a portion of a mobile wireless terminal in accordance with another example embodiment.

In a further embodiment shown in FIG. 4A, values of the numerical chain may be used to generate at least part, if not all, of a new IP address for the UE. When the UE attaches to a new access node it must disclose the next value of the numerical chain. It could also use that value to generate the interface identifier part of an IP address in accordance with the methods of British Patent No. 2367986 and U.S. Pat. No. 7,155,500, the contents of which are incorporated herein by reference. Accordingly, FIG. 4A shows the UE as further comprising IP address generator 30 which uses the next value of the numerical chain to generate the interface identifier part of the IP address.

According to a further example embodiment, each time the UE wishes to attach itself to a new access node, it discloses an H value further along in the sequence than the next one, e.g. if the UE disclosed $H_3$ to the last access node it attached itself to, then it may disclose $H_5$ (or any higher H value, up to $H_n$) rather than $H_4$. In this case the new access node must apply the hash( ) function to the disclosed value more than once in order to compare its output to the most recently distributed public H value.

Any further access node may only have been supplied with $H_1$ and an indication from earlier update notifications that the UE has switched access nodes a given number m of times. On the basis of this information alone, the further access node knows that it must apply the one-way coding function at least m+1 times, up to a maximum of n−1 times, to the H value supplied by the UE seeking authentication. If none of the hashed values corresponds to that provided by the UE, the access node must assume that the re-authentication request is not permissible.

Figure 4B:
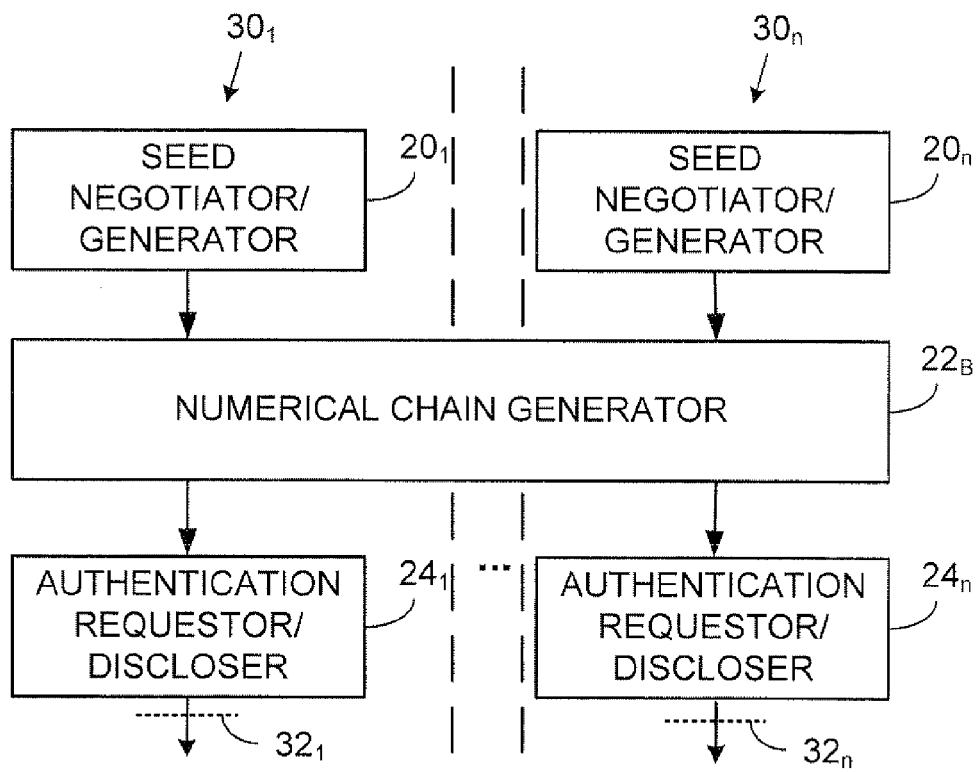
FIG. 4B illustrates diagrammatically the architecture of a portion of a mobile wireless terminal in accordance with yet another example embodiment.
Figure 4C:
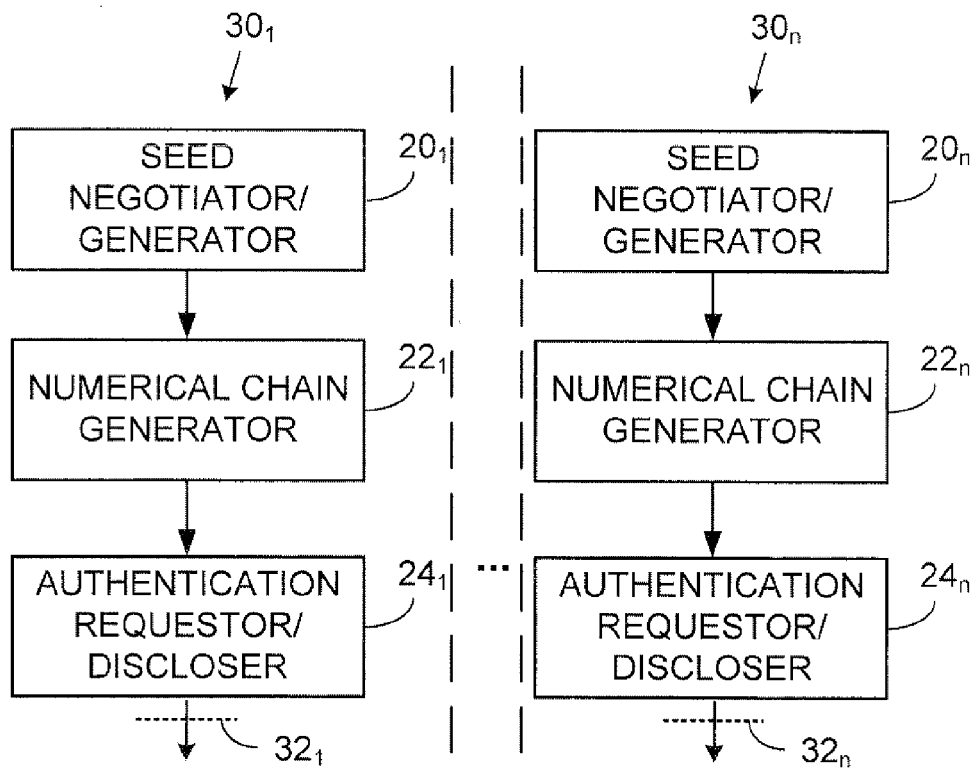
FIG. 4C illustrates diagrammatically the architecture of a portion of an access node in accordance with still another example embodiment.

In accordance with a further example embodiment illustrated in FIG. 4B, multiple numerical chains are generated by the UE and the home network so that the UE may use them in parallel on multiple interfaces. FIG. 4B specifically shows the UE as comprising multiple sections $30_1$ through $30n$, with each section 30 comprising seed negotiator/generator 20; authentication requestor/discloser 24; and interface 32. In the example of FIG. 4B, the multiple chains are generated using different seed values and the same one-way coding function (e.g., the same one-way coding function generator 22B). Alternatively, as shown by the UE embodiment of FIG. 4C, the multiple chains may implement a different one-way coding function, e.g., coding function generators $22_{C1}$-$22_{Cn}$, with subsequent communications bearing an indication of which coding function has been implemented on a given chain. This creates a fast "multi-homing" mechanism where only a single initial authentication is required even on a node with multiple interfaces. A different numerical chain must be used for each interface in order to avoid a replay attack.

In accordance with a further example embodiment, the numerical chains are bound to a specific MAC address on an access node interface by modifying the one-way coding function such that $H_{i-1}$=hash($H_i$, MAC address), rendering it impossible for a third party to claim that a given numerical chain is valid for another MAC address. Even if a third party obtains the UE's MAC address, any attempt to imitate the UE will necessarily be stamped with the third party's own MAC address, and the access nodes will be able to reject this service request as being fraudulent.

In accordance with further example embodiments, there is provided a method for deriving a secure authentication key for use when a UE switches access nodes as described above. It is initially assumed that the UE and the first access node share a common authentication key $K_{S0}$. Methods for achieving this are well-known. In a further embodiment, upon switching from a first access node to a new access node, the first access node sends a message containing the value hash ($K_{S0}$) to the new access node, which sends these values to the UE. The UE can then confirm, by hashing $K_{S0}$ itself, that this message did indeed originate at the first access node. The UE and the new access node can then derive a new authentication key using the equation $K_{S1}$=hash(hash($K_{S0}$)). The new access node cannot determine the original authentication key $K_{S0}$ since it cannot reverse the one-way coding function hash ($K_{S0}$) to obtain $K_{S0}$. The message sent by the first node may also include a nonce $N_{P0}$, in which case the new authentication key is generated using the equation $K_{S1}$=hash(hash($K_{S0}$), $N_{P0}$).

In a further embodiment the first access node sends a hash of the authentication key, hash($K_{S0}$), to the new access node, and the mobile node and the new access node exchange nonces $N_{C1}$ and $N_{A1}$, a new authentication key being derived using the equation $K_{S1}$=hash(hash($K_{S0}$), $N_{C1}$, $N_{A1}$), such that the first access node cannot learn the new authentication key unless it intercepts the nonce exchange, and the new access node cannot learn the earlier authentication key since it cannot reverse the one-way coding function to obtain $K_{S0}$. In a still further embodiment, the first access node may also send a nonce NP0 along with the value of hash(KS0), in which case the new authentication key is generated using the equation $K_{S1}$=hash(hash($K_{S0}$), $N_{P0}$, $N_{C1}$, $N_{A1}$).

The present technology provides a method of authenticating a mobile node to an access node of an access network. It will be appreciated by the skilled person that various modifications may be made to the above embodiments without departing from the scope of the present invention.

The invention claimed is:

1. A mobile wireless terminal comprising:
 a generator configured to generate and store a first numerical chain comprising a series of n values using a one-way hash coding function such that a given value $H_{i-1}$ within the chain is easily obtainable from a subsequent value $H_i$, but the subsequent value is not easily obtainable from that given value, and
 an authentication requestor configured to disclose a value from the numerical chain to an access node, in order to allow the access node to authenticate the mobile wireless terminal, wherein when the mobile wireless terminal moves to a new access node, the authentication requestor is further configured to disclose a value from the numerical chain to the new access node that succeeds the values already disclosed by the mobile wireless terminal.

2. A mobile wireless terminal according to claim 1, wherein the generator is configured to generate the chain by successive application of the one-way coding function to a seed value $H_n$.

3. A mobile wireless terminal according to claim 2, wherein the seed value $H_n$ is based upon an EAP MSK or EMSK value.

4. A mobile wireless terminal according to claim 2, wherein the generator comprises a random number generator for generating the seed value $H_n$.

5. A mobile wireless terminal according to claim 1 and comprising a plurality of interfaces towards respective access nodes, the generator being configured to generate a numerical chain for each interface.

6. A mobile wireless terminal according to claim 1 further comprising an IP address generator arranged to use a value of the numerical chain to generate at least part of an IP address for the mobile wireless terminal.

7. A mobile wireless terminal according to claim 1, wherein the generator is arranged to bind said numerical chain to a specific MAC address corresponding to a specific access node.

8. An access node of a communication system comprising:
 a notification receiver configured to receive, from another node of the communication system, a notification each time a mobile node has been successfully authenticated by the communication system; means for receiving from a mobile node a value of a first numerical chain comprising a series of n values using a one-way coding function such that a given value within the chain is easily obtainable from a subsequent value, but the subsequent value is not easily obtainable from that given value; and
 an authenticator configured to authenticate the mobile node on the basis of that value and the previously received notifications.

9. A control node of a communication system comprising:
 a value receiver configured to receive, from a mobile node or an access node, each time the mobile node moves to an access node, a value of a first numerical chain comprising a series of n values generated using a one-way coding function such that a given value within the chain is easily obtainable from a subsequent value, but the subsequent value is not easily obtainable from that given value;

an authenticator configured to authenticate the mobile node on the basis of that value and another value from the numerical chain previously received when authenticating the mobile node to another access node; and a notification message generator configured to notify the access node that the mobile node has been authenticated.

* * * * *